(12) United States Patent  
Powell et al.

(10) Patent No.: US 10,691,887 B2  
(45) Date of Patent: Jun. 23, 2020

(54) TECHNIQUES FOR AUTOMATIC PROOFING OF TEXTUAL DATA

(71) Applicant: MICROSOFT TECHNOLOGY LICENSING, LLC, Redmond, WA (US)

(72) Inventors: Kevin R. Powell, Kirkland, WA (US); Domenic J. Cipollone, Redmond, WA (US); Michael W. Daniels, Redmond, WA (US); Olivier M. Gauthier, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 15/995,699

(22) Filed: Jun. 1, 2018

(65) Prior Publication Data

US 2019/0311031 A1    Oct. 10, 2019

Related U.S. Application Data

(60) Provisional application No. 62/654,891, filed on Apr. 9, 2018.

(51) Int. Cl.
*G06F 17/27* (2006.01)
*G06F 17/21* (2006.01)
(Continued)

(52) U.S. Cl.
CPC .......... *G06F 40/232* (2020.01); *G06F 40/166* (2020.01); *G06F 40/216* (2020.01); *G06F 40/253* (2020.01)

(58) Field of Classification Search
CPC .............................. G06F 17/273; G06F 17/276
See application file for complete search history.

(56) References Cited

U.S. PATENT DOCUMENTS

| | | | |
|---|---|---|---|
| 7,346,892 B2 * | 3/2008 | Shou | G06F 8/33 717/107 |
| 7,880,730 B2 * | 2/2011 | Robinson | G06F 3/0219 345/172 |

(Continued)

OTHER PUBLICATIONS

Sundby, David. "Spelling correction using N-grams." Technical notes (2009). (Year: 2009).*

(Continued)

*Primary Examiner* — Jialong He

(57) ABSTRACT

Techniques for automatic proofing of textual data is described. In one embodiment, these techniques are directed towards producing proofed textual data for various operational environments via logic operative on a logic circuit to access information comprising a set of n-grams, at least one mapping between at least one replacement n-gram and a corresponding n-gram in the set of n-grams, and a corresponding confidence score for each mapping being determined by user activity while producing text for various applications; process input to a productivity application comprising textual data and identify a portion thereof to replace based upon the accessed information; and automatically modify the portion of the textual data using a replacement n-gram selected from the replacement n-grams based upon a corresponding confidence score between the portion of the textual data and the replacement n-gram. Other embodiments are described and claimed.

20 Claims, 8 Drawing Sheets

(51) Int. Cl.
*G06F 40/232* (2020.01)
*G06F 40/166* (2020.01)
*G06F 40/216* (2020.01)
*G06F 40/253* (2020.01)

(56) References Cited

U.S. PATENT DOCUMENTS

| | | | | |
|---|---|---|---|---|
| 8,341,520 | B2* | 12/2012 | Iakobashvili | G06F 40/232 |
| | | | | 715/257 |
| 9,230,214 | B1* | 1/2016 | Joseph | G06N 5/02 |
| 2007/0050728 | A1* | 3/2007 | Vayssiere | G06F 17/276 |
| | | | | 715/780 |
| 2007/0265832 | A1* | 11/2007 | Bauman | G06F 17/273 |
| | | | | 704/10 |
| 2008/0065617 | A1* | 3/2008 | Burke | G06F 16/3325 |
| 2010/0180198 | A1* | 7/2010 | Iakobashvili | G06F 17/273 |
| | | | | 715/257 |
| 2011/0087961 | A1* | 4/2011 | Fitusi | G06F 17/276 |
| | | | | 715/261 |
| 2011/0202836 | A1* | 8/2011 | Badger | G06F 3/0237 |
| | | | | 715/702 |
| 2014/0012567 | A1* | 1/2014 | Caskey | G06F 17/276 |
| | | | | 704/9 |
| 2016/0132545 | A1* | 5/2016 | Bodin | G06F 17/273 |
| | | | | 707/609 |

OTHER PUBLICATIONS

Bassil et al. "ASR Context-Sensitive Error Correction Based on Microsoft N-Gram Dataset", Journal of Computing, vol. 4, Issue 1, Jan. 2012. (Year: 2012).*

* cited by examiner

*200*

"It is better to give than to recive

*204*

"It is better to give than to receive" is a saying.

400

ACCESS INFORMATION COMPRISING A SET OF N-GRAMS, AT LEAST ONE MAPPING BETWEEN AT LEAST ONE REPLACEMENT N-GRAM AND AN N-GRAM, AND A CORRESPONDING CONFIDENCE SCORE FOR EACH MAPPING
402

PROCESS INPUT COMPRISING TEXTUAL DATA
404

IDENTIFY A PORTION OF THE TEXTUAL DATA TO REPLACE
406

MODIFY THE PORTION OF THE TEXTUAL DATA
408

ACCESS A SET OF COMMONLY-MISSPELLED WORDS
502

ACCESS AN AUTOCORRECTION THRESHOLD VALUE
504

IDENTIFY A MISSPELLED WORD
506

REPLACE THE MISSPELLED WORD
508

RECORD TELEMETRY DATA
602

IDENTIFY EDIT(S) TO CORRECT AN ERROR IN AN N-GRAM ACCORDING TO THE TELEMETRY DATA
604

COMPUTE A CORRESPONDING CONFIDENCE SCORE
606

MODIFY AN AUTOCORRECTION THRESHOLD VALUE
608

*FIG. 6*

TECHNIQUES FOR AUTOMATIC PROOFING OF TEXTUAL DATA

CROSS-REFERENCE TO RELATED APPLICATION

This application claims the benefit of and priority to previously filed U.S. Provisional Patent Application Ser. No. 62/654,891, filed Apr. 9, 2018, entitled "Framework for generating, deploying and improving automatic proofing correction models", which is hereby incorporated by reference in its entirety.

BACKGROUND

Almost all modern computing technologies utilize textual data (or text in digital form). Textual data, when used as a mode of communication, must be proofed (e.g., spelled) correctly in order to accurately communicate information (e.g., messages) to people and/or computers. Textual data can also be utilized as instructions for some technology to perform one or more tasks. It is paramount to the functioning of any technology that the clarity and correctness of the textual data is maintained. It is with respect to these and other considerations that the present improvements have been needed.

For at least this reason, a significant amount of time and expense is being delegated to technological improvements in productivity systems (e.g., word processing software, messaging systems, and/or the like).

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for automatic proofing of textual data. Some embodiments are particularly directed to techniques to produce proofed textual data for documents, communications and/or the like. In one embodiment, for example, an apparatus may comprise a logic circuit and logic operative on the logic circuit to access information comprising a set of n-grams, at least mapping between at least one replacement n-gram and an n-gram in the set of n-grams, and a corresponding confidence score for each mapping being determined by user activity while producing text for various computing applications, process input to a productivity application comprising textual data and identify a portion thereof to replace based upon the accessed information, and automatically modify the portion of the textual data using at least one replacement n-gram from the replacement n-grams based upon the corresponding confidence score of the at least one n-gram. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates an embodiment of a logic flow for the system of FIG. 1.

FIG. 5 illustrates an embodiment of a logic flow for the system of FIG. 1.

FIG. 6 illustrates an embodiment of a logic flow for the system of FIG. 1.

DETAILED DESCRIPTION

Figure 1:
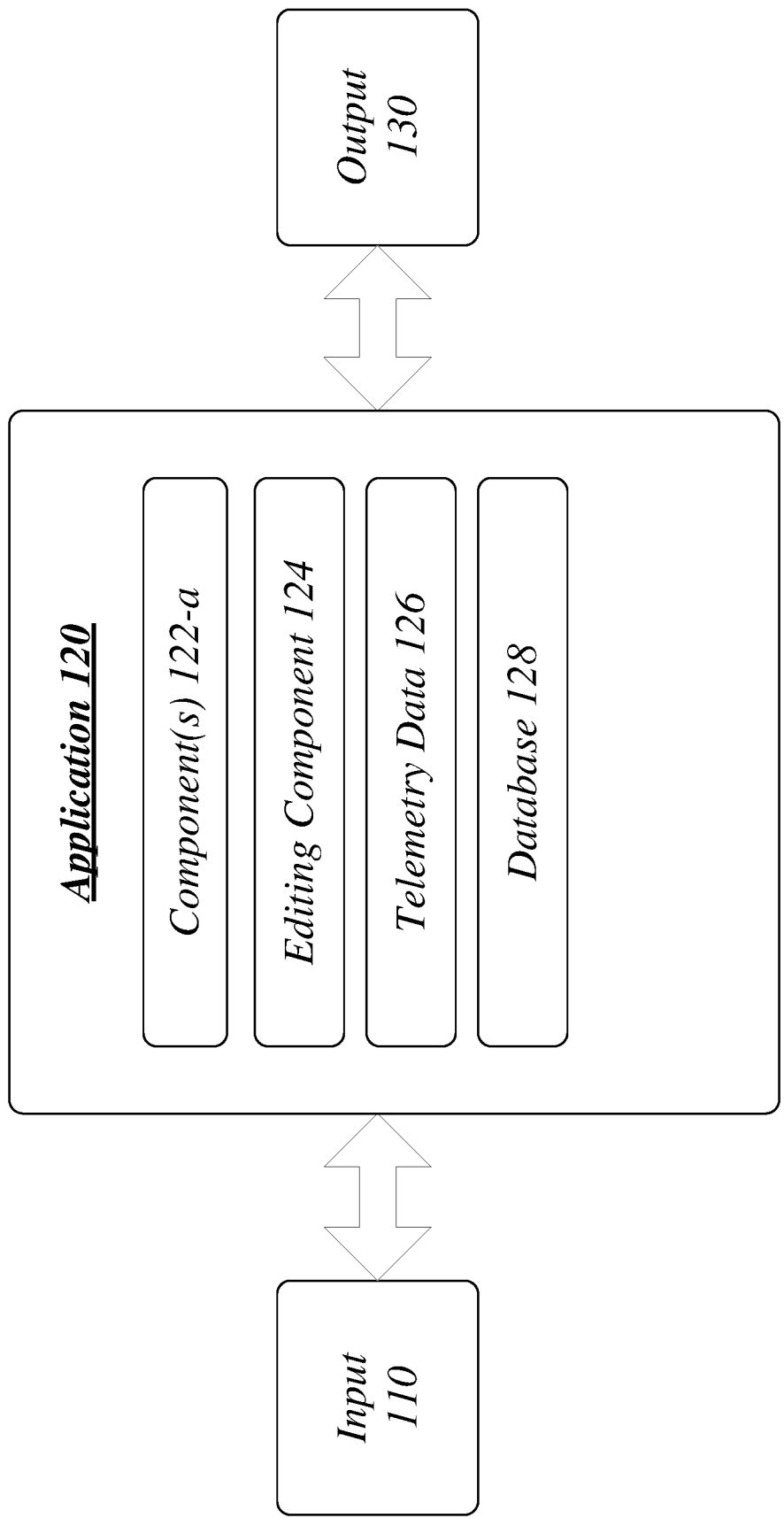
FIG. 1 illustrates an embodiment of a system for automatic proofing of textual data.

Various embodiments of the present disclosure implement technology directed to produce proofed textual data for use in computing devices. Some embodiments utilize such technology when executing techniques for automatic proofing of the textual data. In one example embodiment, such technology may execute a computer-implemented method, comprising: accessing information comprising a set of n-grams, at least mapping between at least one replacement n-gram and an n-gram in the set of n-grams, and a corresponding confidence score for each mapping being determined by user activity while producing text for various computing applications; processing input to a productivity application comprising textual data and identifying a portion thereof to replace based upon the accessed information; and automatically modifying the portion of the textual data using at least one n-gram from the replacement n-grams. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having a software application 120 comprising one or more components 122-a. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=3, then a complete set of components 122-a may include components 122-1, 122-2, and 122-3. The embodiments are not limited in this context.

The system 100 may comprise the application 120. The application 120 may be generally arranged to process input 110 that may be some form of data including textual data, such as alphanumeric symbols, mathematical symbols, punctuation marks, technological symbols (e.g., the "@" symbol), and/or the like. In some embodiments, the application 120 may be a type of productivity application, such as a word processing application (e.g., MICROSOFT® WORD™), an e-mail application (e.g., MICROSOFT® OUTLOOK™), a messaging platform (e.g., MICROSOFT® SKYPE™), or any other type of application capable of processing some form of textual data.

The application 120 may comprise an editing component 124. The editing component 124 may comprise computer-executable instructions generally arranged to modify any textual data for various purposes. The editing component 124, while processing a paragraph of the textual data, can identify and/or modify an incorrect word in the paragraph by replacing that incorrect word with a correct word as identified via a set or list of commonly incorrect n-grams. In some embodiments, the editing component 124 may enhance the application 120 by executing an autocorrection of any incorrect n-gram (e.g., misspelled words or phrases). For example, by comparing one or more words of the textual data to n-grams provided in the set or list of commonly incorrect n-grams, the editing component 124 may determine whether the one or more words have an error and in response to an identification of at least one error, automatically modify the textual data to correct the at least one error.

According to various embodiments of the system 100, the editing component 124 processes telemetry data 126 received from users of various computing applications, such as productivity applications including e-mail applications and word processing applications. The telemetry data 126, as described herein, generally refers to any user activity or input while producing text for the various computing applications; the user activity or input may include, but is not limited to, pointer movement, mouse clicks, key strokes, voice commands, gestures, and/or the like. Some embodiments of the telemetry data 126 includes one or more click-actions (e.g., mouse click-actions) to correct a misspelled word by replacing the misspelled word with a suggested correctly spelled word. This may occur or may not occur after the editing component 124 identifies the misspelled word and produces indicia on a computer screen to notify the user of that misspelled word and its location. The indicia can be in any form and, as an example, an underline or a squiggly/wavy line in a color other than the color of the textual data.

When the user's click-action operates to replace the misspelled word with the suggested correctly spelled word, the click-action produces a pairing or mapping between the misspelled word and the correctly spelled word. The editing component 124 stores the pairing/mapping in a database 128. Example implementations of the system 100 further aggregates the telemetry data 126 from various users of the application 120 from across a network such as the Internet and based upon the aggregated telemetry data 126, the editing component 124 computes a corresponding confidence scope for the above pairing or mapping. If a significant number of other application users also selected the correctly spelled word to replace the misspelled word, the editing component 124 may assign a high confidence score to the pairing/mapping to indicate that the correctly spelled word is the word most likely intended by the user. In some embodiments, the editing component 124 aggregates the telemetry data 126 from other users of similar applications and identifies additional pairings/mappings between misspelled words and their correctly spelled versions. The editing component 124 adds these pairings/mappings to the database 128 to build a list of commonly-misspelled words and their correct spellings.

Figures 2A, 2B:
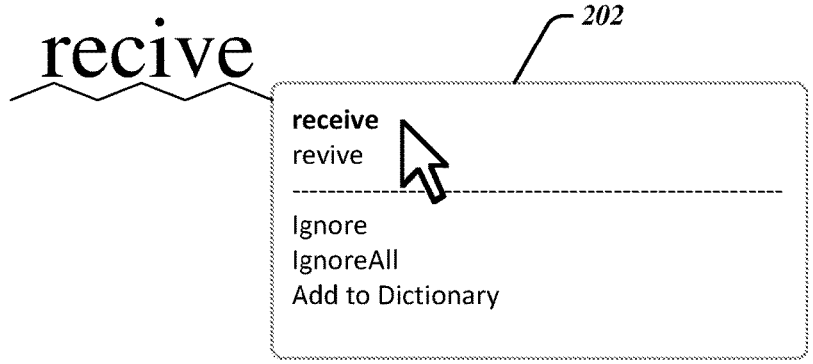
FIG. 2A illustrates an embodiment of an operational environment for the system of FIG. 1.
FIG. 2B illustrates an embodiment of an operational environment for the system of FIG. 1.

FIG. 2A illustrates an embodiment of an operational environment 200 for the system 100. The intention behind the present disclosure's description of "operational environment" is for the operational environment 200 to represent any type of environment or medium for presenting and editing textual data, preferably in some productivity application. To illustrate by way of example, the operational environment 200 may be a document, an e-mail message, and/or the like.

It is appreciated that by "telemetry data", the present disclosure intended to include any type of computing device diagnostic capable of being quantified. As shown in FIG. 2A, telemetry data in the form of a click-action is recorded by the system 100. It is further appreciated that various accessory devices are available to facilitate execution of the click-action, such as a mouse or another pointer device, a touch-screen, and/or the like.

The system 100 produces a dialog box 202 for presentation on a computer display in response to an identification of a misspelled word. As illustrated in FIG. 2A, the misspelled word is "receive" and the dialog box 202 includes a number of suggested words to replace the identified misspelled word. A click-action event recorded on one of the suggested words generates a pairing or mapping between a commonly misspelled word and a correctly spelled word. As an example, the click-action on "receive" in the dialog box 202 generates a pairing or mapping between "recive" and "receive." Because the telemetry data indicates a significant number of application users replacing "recive" with "receive" when given a choice amongst the suggested words, "receive" is most likely the intended word when "recive" is provided as input. Therefore, the system 100 assigns a very high corresponding confidence score to the mapping between "receive" and "recive" such that, in some embodiments, the system 100 performs an autocorrection by replacing the misspelled word "recive" with "receive" in future occurrences of that misspelling.

FIG. 2A also includes "revive" as a suggested word; however, a fewer number of users replaced "recive" with "revive" when given the choices in the dialog box 202. Therefore, the system 100 may assign a lower corresponding confidence score to the mapping between "recive" and "revive" than the mapping between "recive" and "receive" amongst the suggested words. Even though the mapping between "revive" and "receive" may exceed an autocorrection threshold value, the word "revive" is less likely to be the intended word than "receive" when "recive" is provided as input to the application. Depending on how much the corresponding confidence score for "receive" exceeds the corresponding confidence score for "revive", the system 100 may perform an autocorrection of "recive" to "receive" when "recive" is provided as input.

The dialog box 202 also includes a number of options including "Ignore", "IgnoreAll", and "Add to Dictionary." In general, a click-action on "Ignore" instructs the system 100 to ignore the misspelled word, a click-action on "IgnoreAll" instructs the system 100 to ignore each and every occurrence of the misspelled word in a present document, and a click-action on "Add to Dictionary" instructs the system 100 to ignore the misspelled word in every document.

FIG. 2B illustrates an embodiment of an operational environment 204 for the system 100. It is appreciated that same misspelling of "receive" as illustrated in the operational environment 202 for FIG. 2A, "recive", occurs in the operational environment 204. However, as shown in FIG. 2B, the system 100 no longer generates a dialog box for the user to perform a manual correction as illustrated in FIG. 2A; instead, the operational environment 204 automatically performs an autocorrection as a response to the misspelling of "receive" allowing the user to input textual data uninterrupted. The autocorrection featured in FIG. 2B demonstrates that the dialog box of FIG. 2A can be bypassed while producing the textual data. Accordingly, the user and the system 100 can leverage this autocorrection feature to produce documents, communications, etc. quickly without having to directly edit the textual data to correct any errors.

Figure 3:
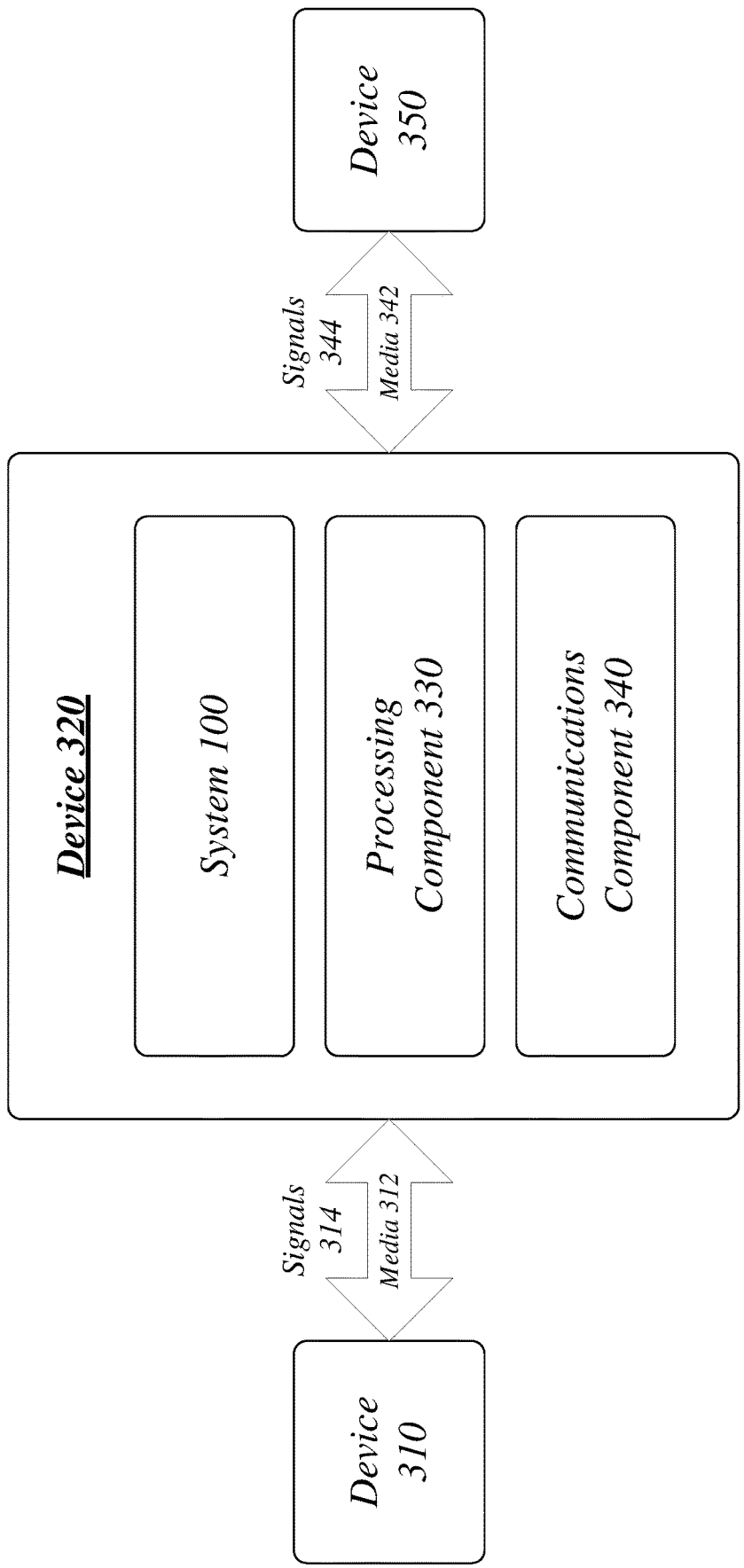
FIG. 3 illustrates an embodiment of a centralized system for the system of FIG. 1.

FIG. 3 illustrates a block diagram of a centralized system 300. The centralized system 300 may implement some or all of the structure and/or operations for the system 100 in a single computing entity, such as entirely within a single device 310 or device 350.

The device 320 may comprise any electronic device capable of receiving, processing, and sending information for the system 100. According to some embodiments, the device 320 aggregates telemetry data from users of devices such as the device 310 and the device 350. As an example, the device 320 aggregates click-actions when users of the device 310 and the device 350 correct misspelling when producing documents comprising textual data.

Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 320 may execute processing operations or logic for the system 100 using a processing component 330. The processing component 330 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 320 may execute communications operations or logic for the system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 312, 342 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 320 may communicate with other devices 310, 350 over a communications media 312, 342, respectively, using communications signals 314, 344, respectively, via the communications component 340. The devices 310, 350 may be internal or external to the device 320 as desired for a given implementation.

Included herein is a flow chart representative of an exemplary methodology for performing novel aspects of the disclosed architecture. While, for purposes of simplicity of explanation, one methodology shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 4 illustrates one embodiment of a logic flow 400. The logic flow 400 may be representative of some or all of the operations executed by one or more embodiments described herein. In some embodiments, an editing component of a productivity application executes the logic flow 400 to effectuate an autocorrection feature of that application.

In the illustrated embodiment shown in FIG. 4, the logic flow 400 accesses information comprising a set of n-grams, at least one mapping between at least one replacement n-grams and an n-gram of the set of n-grams, and a corresponding confidence score for each mapping. Some example embodiments describe the above information as including pairings between a particular n-gram of the set of n-grams and a corresponding replacement n-gram. The particular n-gram may map to more than one corresponding replacement n-gram such that each corresponding replacement n-gram is a possible modification to the particular n-gram. Various embodiments compute the corresponding confidence score based upon telemetry data capturing user activity while producing text for various applications. In some example embodiments, the corresponding replacement n-grams may be ranked and/or sorted according to some criteria.

The logic flow 400 may process input to a productivity application comprising textual data at block 404. It is appreciated that the above-mentioned textual data may be arranged in various forms, such as (but not limited to) e-mail message text, document text, instant message text, and/or the like. For example, the logic flow 400 may capture the textual data being entered directly into a productivity application, such as an e-mail application, a word processing application, a spreadsheet application, a messaging application, and/or the like. As another example, the logic flow 400 may process the textual data when opening, in the productivity application, a file representing a document, an e-mail, or another format.

The logic flow 400 may identify a portion of the textual data to replace at block 406. In some embodiments, the logic flow 400 compares certain words of the textual data to the accessed information of block 402 and, based upon such a comparison, determines whether to modify any words of the textual data. Some embodiments of the logic flow 400 identify one or more errors in the textual data including spelling errors, grammatical errors, style errors, and/or other types of errors and/or refinements. The accessed information may include a corresponding confidence score for each mapping between the identified portion of the textual data and one or more words of a potential replacement n-gram.

The logic flow 400 may modify the identified portion of the textual data at block 408. According to some embodiments, the logic flow 400 implements an autocorrection threshold value to determine whether or not to perform an autocorrection and modify the identified portion of the textual data. If the corresponding confidence value between the identified portion of the textual data and the potential replacement n-gram exceeds the autocorrection threshold value, the logic flow executes the autocorrection and replaces the identified portion of the textual data with the word(s) of the potential replacement n-gram. As described herein, the autocorrection threshold value quantifies a level of confidence in the above-mentioned mappings/pairings of the accessed information. An example set of n-grams and corresponding replacement n-grams having a low autocorrection threshold value may indicate a high confidence level and vice versa. If the logic flow 400 attributes a high confidence level in the mappings/pairings between a particular n-gram of the set of n-grams and the replacement n-grams, then any document text or e-mail text matching the particular n-gram is most likely misspelled, has grammatically errors, or is otherwise incorrect and in need of autocorrection. Hence, any word(s) used in such a set of n-grams has/have a high likelihood of being incorrect and the word(s) used to replace any incorrect word(s) is/are likely to rectify the incorrectness.

In some embodiments, the logic flow 400 executes the above correction automatically and without interruption to the user's input to the productivity application. The logic flow 400 may perform such a correction as part of an autocorrection of a misspelled word, such as in the logic flow depicted in FIG. 5. For example, the logic flow 400 may identify a word that is similar to a misspelled word in a set of misspelled n-grams having a low autocorrection threshold value. Although the identified word does not exactly match the misspelled word from the set of misspelled n-grams, the identified word is considered misspelled in view of the low autocorrection threshold value. The similarities are sufficient to render inconsequential or negligible the probability of having a false-positive. Having exceeded the autocorrection threshold value, the logic flow 400 modifies the identified word by replacing that misspelled word with a correctly spelled word that accurately matches the user's intention except for the misspelling. The embodiments are not limited to this example.

FIG. 5 illustrates one embodiment of a logic flow 500. The logic flow 500 may be representative of some or all of the operations executed by one or more embodiments described herein. In some embodiments, an editing component of a productivity application executes the logic flow 500 to effectuate an autocorrection feature of that application.

In the illustrated embodiment shown in FIG. 5, the logic flow 500 accesses a list or set of commonly-misspelled words at block 502. For example, the logic flow 500 may use telemetry data to identify click-actions to correct misspelled words. These click-actions determine mappings/pairings between a misspelled word and its correct spelling, which in turn builds the set of commonly-misspelled words.

The logic flow 500 may access an autocorrection threshold value at block 504. The autocorrection threshold value may represent a level of confidence in the set of commonly-misspelled words and their pairings with correctly-spelled versions. For example, the autocorrection threshold value determines an aggressiveness of the autocorrection feature of the application's editing component. Based upon feedback from execution of the autocorrection feature, the application's editing component may adjust the autocorrection threshold value in order to reduce a false positive rate. As shown herein, when given corrective replacement n-grams for a misspelling, some example implementations of the application's editing component may compare the autocorrection threshold value to a corresponding confidence score for each replacement n-gram and based upon that comparison, may identify a best replacement n-gram to execute an autocorrection. The application's editing component may select, amongst the replacement n-grams with corresponding confidence scores exceeding the autocorrection threshold value, the replacement n-gram having a highest corresponding confidence score as the best replacement n-gram for correcting the misspelling.

The logic flow 500 may identify a misspelled word at block 506. For example, the editing component may process as input to the application a document comprising textual data and identify at least one misspelled word. As an alternative, a misspelled word may be entered as input to the application via an input device, such as a keyboard. The misspelled word(s) may be included in the list of commonly-misspelled words.

The logic flow 500 may replace the misspelled word with a correctly spelled version of the misspelled word at block 508. For example, in the set of commonly-misspelled words, the misspelled word may map to one or several correctly-spelled words having corresponding confidence scores above the autocorrection threshold value. It is appreciated that some correctly-spelled words are better choices as replacements for the misspelled word than other correctly-spelled words; the corresponding confidence scores enable discrimination amongst the choices of correctly spelled words. As described herein, the corresponding confidence scores may be based upon telemetry data (e.g., user click-actions) associated with various productivity application users from across a network such as the Internet. The best fitting correctly spelled word amongst the choices may be the word having a highest corresponding confidence score (e.g., indicating a statistically significant number of user click-actions to replace the misspelled word with that correctly spelled word). The worst choice may be the correctly spelled word having a lowest corresponding confidence score amongst the choices of correctly spelled words to replace the misspelled word. During execution of the autocorrection feature, once the productivity application's editing component identifies the misspelled word, the editing component automatically replaces the misspelled word with the best fitting correctly spelled word. The embodiments are not limited to this example.

FIG. 6 illustrates one embodiment of a logic flow 600. The logic flow 600 may be representative of some or all of the operations executed by one or more embodiments described herein. In some embodiments, an editing component of a productivity application executes the logic flow 600 to effectuate an autocorrection feature of that application.

In the illustrated embodiment shown in FIG. 6, the logic flow 600 may record telemetry data at block 602. It is appreciated that the telemetry data mentioned herein may encompass any type of diagnostic data transmitted by computing devices, such as data describing user activities with various computing applications. In at least one embodiment, the telemetry data includes click-actions and other user selections entered through the productivity application as well as click-actions and other user selections entered through productivity application or applications running on other users' computers.

The logic flow 600 may identify edit(s) to correct an error in an n-gram according to the telemetry data at block 604 and then, at block 606, the logic flow may compute a corresponding confidence score based upon such edit(s) and telemetry data associated with user activities while producing text with the productivity application. In some embodiments, the logic flow 600 may identify a misspelling in the n-gram and further identify a correction of that misspelling by way of replacing the misspelled n-gram with a correctly spelled version of that n-gram. A user's selection of the replacement n-gram may forge a pairing or mapping associating the misspelled n-gram with the replacement n-gram. To illustrate by way of example, the user may enter textual data of "this is an aplication" where "aplication" is a misspelling in need of autocorrection. In this example, a previous user's selection of "application" to replace "aplication" created a pairing or mapping between these unigrams to enable the logic flow 600 to perform the autocorrection at a subsequent appearance of "aplication" as a misspelling of "application." The logic flow 600 may recognize the misspelling and in response, automatically correct the misspelling such that the textual data is changed to "this is an application"—an n-gram having a correct spelling of "application."

As another example, the user may enter textual data of "this is a pear of shoes" where "pear" is a correctly spelled word but for a context in which the textual data is made. A "pear" is a type of fruit but its inclusion in the n-gram "pear of shoes" renders the textual data of "this is a pear of shoes" non-sensical. Similar to the logic flow illustrated in FIG. 2A, a prior click-action of "pair" in a dialog box (such as the dialog box of FIG. 2A) comprising suggested replacements for "pear" may generate a mapping between "pear" and "pair" when presented in a context of "a pair of . . . " As an alternative, the user may directly edit the word "pear" replacing it with "pair", eliminating any indicia of a misspelling (e.g., a red squiggly line underneath "pear") such that those edit actions generate the mapping between "pear" and "pair" when presented in the context of "a pair of . . . " The mapping is coupled with a corresponding confidence score, which may (at least in part) be based upon other telemetry data besides the above-mentioned click-action or edit action. For instance, the corresponding confidence score may be based upon telemetry data collected from users of various applications (including the productivity application) from across the Internet. The confidence score could also be based upon subsequent user activity including click-actions/edit actions by that same user entered through the productivity application. If a considerable number of other users also made the same click-action replacing "pear" with "pair" in the text, the logic flow 600 may compute a high confidence level for the "pear" and "pair" mapping. Once the mapping is generated and the corresponding confidence score is computed, an autocorrection of the n-gram in this example would replace "pear" with "pair" as the n-gram "a pair of shoes" correctly conveys the user's statement, whereas a "pear of shoes" would be confusing.

In other embodiments, the logic flow 600 may process user activity to identify one or more edits to correct the grammatical error. Consider an example where the logic flow 600 processes textual data having a subject-predicate agreement error such as in "Oliver drive a car," the subject "Oliver" does not agree with the predicate "drive" requiring a replacement of "drive" with "drives" to correct the error. When the user performs the correction, a mapping or pairing is generated between the n-gram "[subject] drive a car" and "[subject] drives a car" when the "[subject]" is singular and not plural. The logic flow 600 may add the pairing or mapping to the set of n-grams for later use in identifying word(s) to automatically replace in textual data in, for example, in a document or an e-mail. Because subject-predicate agreement is well-known grammatical rule, the logic flow 600 may assign a high confidence level to the above mapping. If, on the other hand, the same user later reverses the above correction, reverting the n-gram back to "Oliver drive a car", the logic flow 600 may lower the confidence level corresponding to the "Oliver drive a car" and "Oliver drives a car" as a mapping. This may occur if the context of a document requires "Oliver drive a car" to be used.

In yet another embodiment, the logic flow 600 may produce confidence score with respect to other areas for proofing. The logic flow 600 may generate pairings or mappings between n-grams to correct clarity errors or to otherwise refine the textual data for clarity. To illustrate, the logic flow 600 may process textual data of "I live in Cabo Verde"; while "Cabo Verde" may be correctly spelled and the textual data may be devoid of grammatical errors, a more proper presentation may be "Republic of Cabo Verde" instead of "Cabo Verde". Accordingly, the logic flow 600 may automatically replace "Cabo Verde" with "Republic of Cabo Verde" in a document or e-mail, enhancing the textual data with a clearer meaning.

The logic flow 600 may modify an autocorrection threshold value at block 608. The logic flow 600 may compute a new autocorrection threshold value based on the telemetry data. Some example implementations of the autocorrection threshold value indicate a confidence level that (1) a word or words in an n-gram have factors denoting an error and (2) replacing the word or words in the n-gram with a word or words in a replacement n-gram should correct the error. A comparison between the autocorrection threshold value and a confidence score of a word and a known misspelling of the word constitutes one example measure for determining whether the word is being misspelled, for example, in the document or e-mail. The embodiments are not limited to this example.

Figure 7:
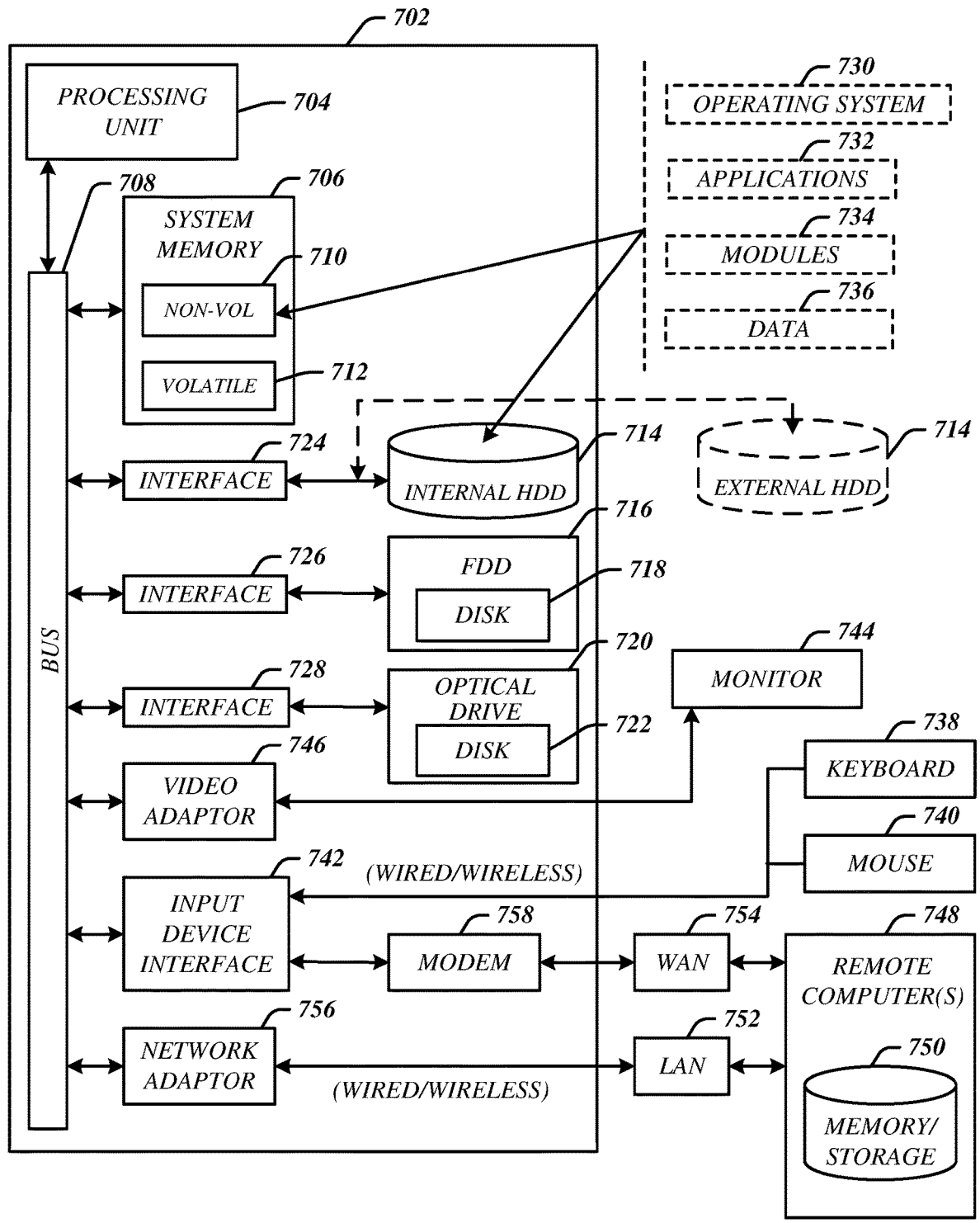
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 3, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and BluetoothlM wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
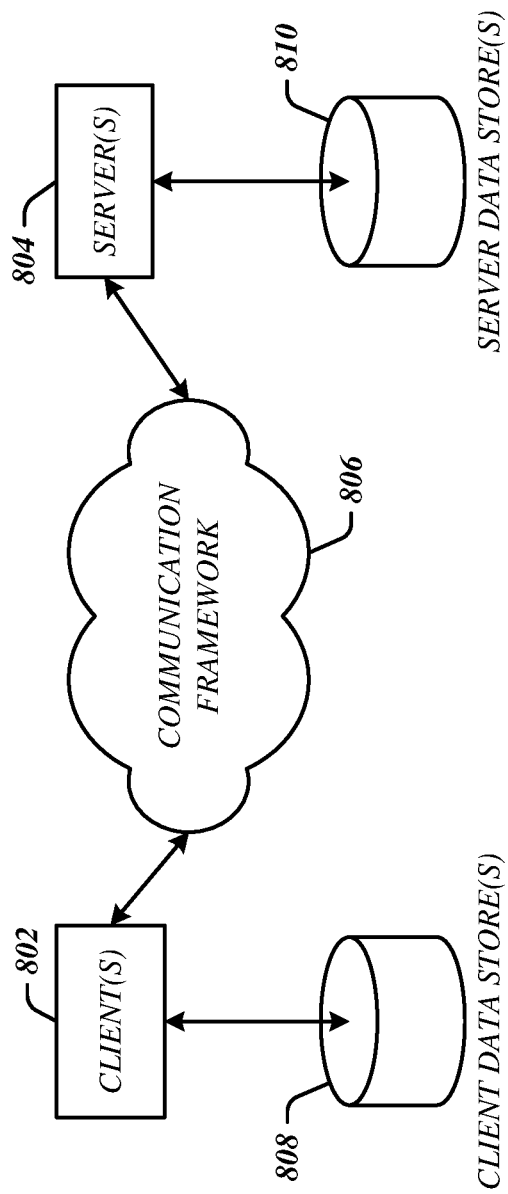
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may implement the device 310 and/or the device 350. The servers 804 may implement the device 320. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a logic circuit; and
   logic operative on the logic circuit to access information comprising:
   a set of n-grams, each n-gram in the set comprising a plurality of words,
   a set of replacement n-grams, each replacement n-gram having a same number of words as the plurality of words,
   at least one mapping between at least one replacement n-gram for a corresponding n-gram in the set of n-grams, and
   a corresponding confidence score for each mapping being determined by user activity while producing text for various one or more applications, wherein a higher confidence score for a mapping for an n-gram corresponds to a higher number of users replacing the n-gram with a first replacement n-gram, and a lower confidence score for the mapping corresponds to a lower number of users replacing the n-gram with a second replacement n-gram;

the logic further operative on the logic circuit to:
process input to a productivity application comprising textual data:
identify a portion of the textual data to replace based upon the accessed information; and
automatically modify the portion of the textual data using at least one word from the replacement n-grams based upon a corresponding confidence score between the portion of the textual data and the at least one word.

2. The apparatus of claim 1 further comprising logic operative on the logic circuit to identify an error in the portion of the textual data.

3. The apparatus of claim 2 wherein the error comprises at least one of a spelling error, a grammatical error, or a style error.

4. The apparatus of claim 1 further comprising logic operative on the logic circuit to replace a word in the portion of the textual data with a word from the replacement n-grams.

5. The apparatus of claim 1 further comprising logic operative on the logic circuit to generate a mapping between an n-gram in the set of n-grams and a replacement n-gram in response to a user selection, amongst a number of n-grams, of the replacement n-gram for the n-gram in the set of n-grams, and compute the corresponding confidence score for the mapping based upon telemetry data associated with the various applications.

6. The apparatus of claim 1 further comprising logic operative on the logic circuit to identify a word having an error in the textual data and modifying the word to correct the error if the error exceeds an autocorrection threshold value.

7. The apparatus of claim 6 further comprising logic operative on the logic circuit to modify the autocorrection threshold value in view of telemetry data corresponding to the user activity.

8. A computer-implemented method, comprising:
accessing information comprising:
a set of n-grams, each n-gram in the set comprising a plurality of words,
a set of replacement n-grams, each replacement n-gram having a same number of words as the plurality of words,
at least one mapping between at least one replacement n-gram and an n-gram in the set of n-grams, and
a corresponding confidence score for each mapping being determined by user activity while producing text for one or more computing applications, wherein a higher confidence score for a mapping for an n-gram corresponds to a higher number of users replacing the n-gram with a first replacement n-gram, and a lower confidence score for the mapping corresponds to a lower number of users replacing the n-gram with a second replacement n-gram;
processing input to a productivity application comprising textual data;
identifying a portion of the textual data to replace based upon the accessed information; and
automatically modifying the portion of the textual data using a replacement n-gram selected from the replacement n-grams based upon a corresponding confidence score between the portion of the textual data and the replacement n-gram.

9. The method of claim 8 further comprising identifying an error in the portion of the textual data.

10. The method of claim 9, wherein the error comprises at least one of a spelling error, a grammatical error, or a style error.

11. The method of claim 8 further comprising replacing a word in the portion of the textual data with a word from the replacement n-grams.

12. The method of claim 8 further comprising generating a mapping between an n-gram in the set of n-grams and the replacement n-gram in response to a user selection, amongst a number of n-grams, of the replacement n-gram for the n-gram in the set of n-grams, and computing the corresponding confidence score for the mapping based upon telemetry data associated with the various applications.

13. The method of claim 8 further comprising identifying a word having an error in the textual data and modifying the word to correct the error if the error exceeds an autocorrection threshold value.

14. The method of claim 13 further comprising modifying the autocorrection threshold value in view of telemetry data associated with the various computing applications.

15. At least one computer-readable storage device comprising instructions that, when executed, cause a system to:
access information comprising:
a set of n-grams, each n-gram in the set comprising a plurality of words,
a set replacement n-grams, each replacement n-gram having a same number of words as the plurality of words,
at least one mapping between at least one replacement n-gram and a corresponding n-gram in the set of n-grams, and
a corresponding confidence score for each mapping being determined by user activity while producing text for one or more applications, wherein a higher confidence score for a mapping for an n-gram corresponds to a higher number of users replacing the n-gram with a first replacement n-gram, and a lower confidence score for the mapping corresponds to a lower number of users replacing the n-gram with a second replacement n-gram;
process input to a productivity application comprising textual data;
identify a portion of the textual data to replace based upon the accessed information; and
automatically modify the portion of the textual data using a replacement n-gram selected from the replacement n-grams based upon a corresponding confidence score between the portion of the textual data and the replacement n-gram.

16. The computer-readable storage device of claim 15, comprising instructions that when executed cause the system to:
identify an error in the portion of the textual data, wherein the error comprises at least one of a spelling error, a grammatical error, or a style error.

17. The computer-readable storage device of claim 15, comprising instructions that when executed cause the system to:
replace a word in the portion of the textual data with a word from the replacement n-grams.

18. The computer-readable storage device of claim 15, comprising instructions that when executed cause the system to:
generate a mapping between an n-gram in the set of n-grams and a replacement n-gram in response to a user selection, amongst a number of n-grams, of the replacement n-gram for the n-gram in the set of n-grams; and compute the corresponding confidence score for the mapping based upon telemetry data associated with the various applications.

19. The computer-readable storage device of claim 15, comprising instructions that when executed cause the system to:

identify a word having an error in the textual data and modifying the word to correct the error if the error exceeds an autocorrection threshold value.

20. The computer-readable storage device of claim 19, comprising instructions that when executed cause the system to:

modify the autocorrection threshold value in view of telemetry data corresponding to the user activity.

* * * * *